May 7, 1968     S. O. GOODSON ET AL     3,381,537
SAMPLING APPARATUS FOR UNGROUND SOLIDS
Filed Jan. 30, 1967     2 Sheets-Sheet 2
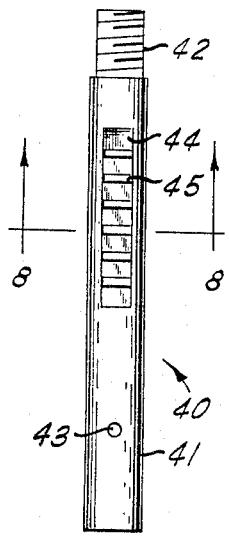
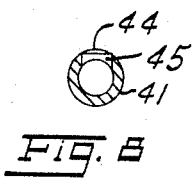
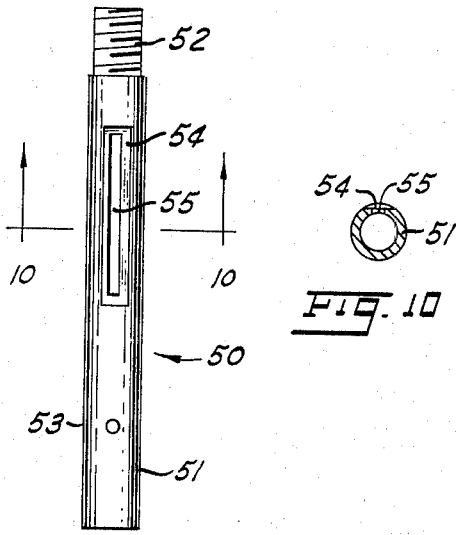
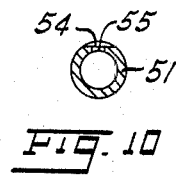
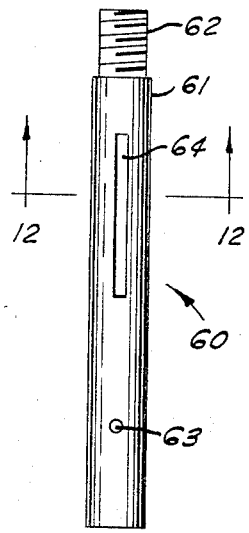
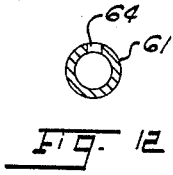
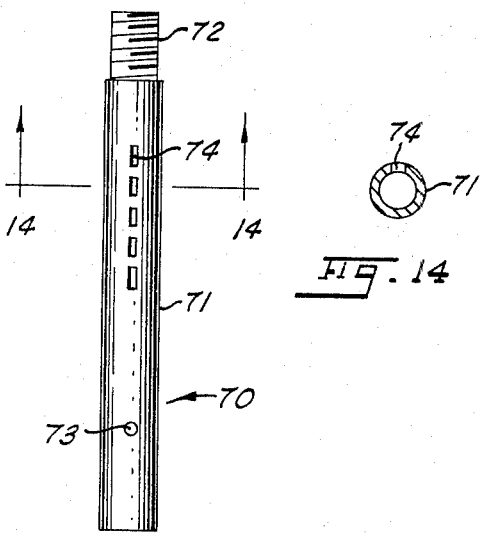
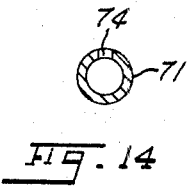
Shirrel O. Goodson
Billy R. Yell
INVENTORS
BY *Rolf J. Williams*
ATTORNEY

United States Patent Office 3,381,537
Patented May 7, 1968

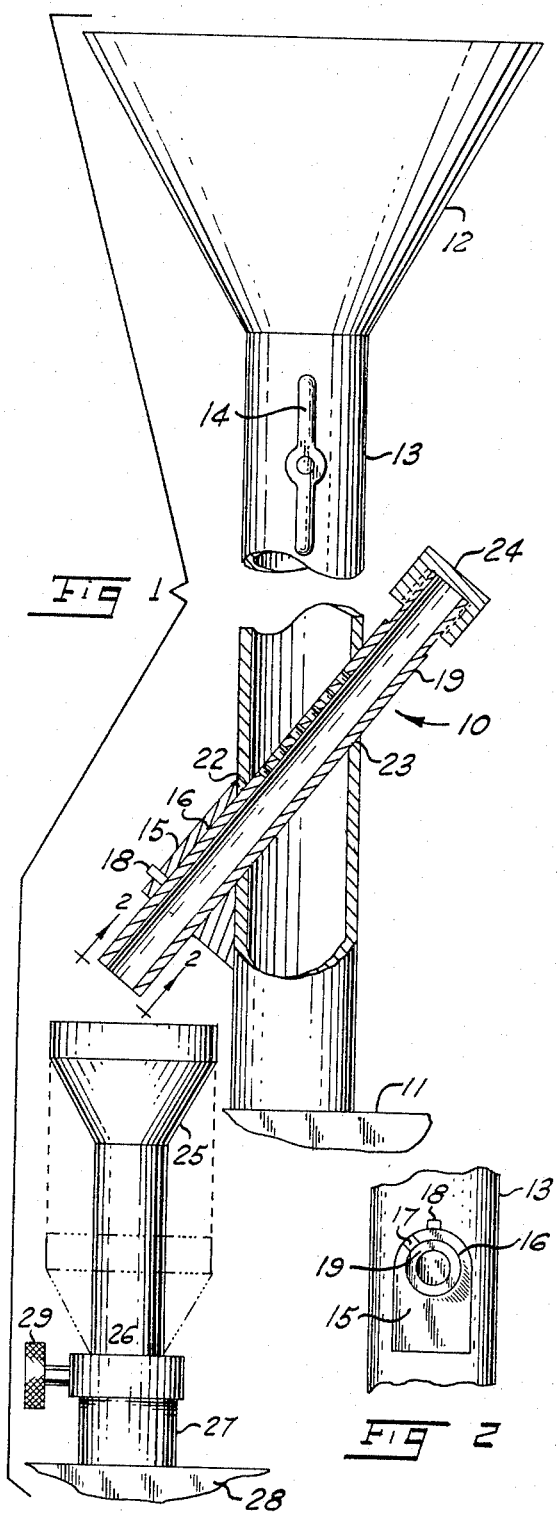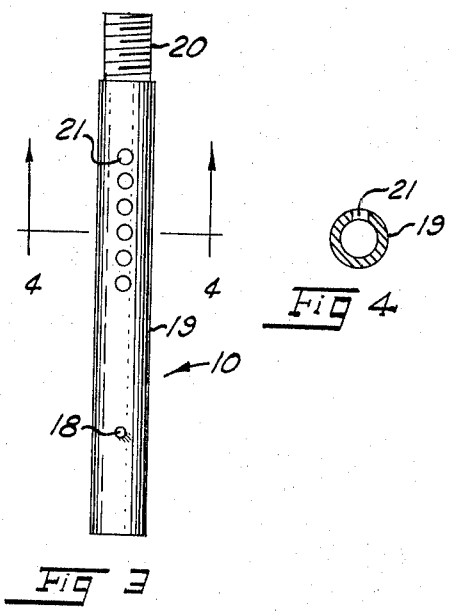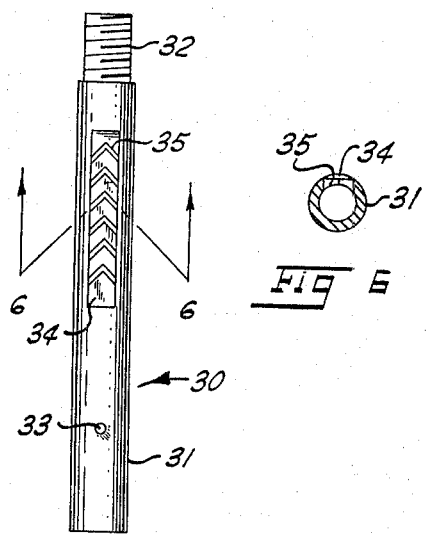

3,381,537
**SAMPLING APPARATUS FOR
UNGROUND SOLIDS**
Shirrel O. Goodson, Union Grove, and Billy R.
Yell, Huntsville, Ala., assignors to Thiokol
Chemical Corporation, Bristol, Pa., a corporation of Delaware
Filed Jan. 30, 1967, Ser. No. 612,726
10 Claims. (Cl. 73—422)

ABSTRACT OF THE DISCLOSURE

A sampling apparatus for unground solids including a removable sampler, that is located in the flow of the solids from a hopper bin into a mixing apparatus for solid propellant, and also discharges the solids collected thereby into a sampling bin.

BACKGROUND OF THE INVENTION

(1) Field of the invention

The sampling apparatus is utilized to sample unground oxidizer that is used in the mixing of solid propellant grains for solid propellant rocket motors.

(2) Description of the prior art

Many types of sampling apparatus had been utilized for this purpose, but prior samples obtained from such apparatus have proved to be unreliable due to many variables in the procedure that may be caused by human errors.

SUMMARY OF THE INVENTION

This invention relates to a sampling apparatus that is provided with various forms of sampling devices and is particularly used to sample the flow of unground oxidizers as they are fed into a mixer for mixing solid propellants for use in solid propellant rocket motors.

Prior sampling devices have proved unreliable in this particular field due to many variables that may occur from human errors and other unforeseeable variations in the consistency of the oxidizers.

It is an object of the invention, therefore, to provide a sampling apparatus for granulated material wherein particle size control and the elimination of human errors is achieved.

The sampling apparatus embodying the invention will also permit exact duplication of the sampling of the granulated material, a very important feature in the mixing of solid propellant.

With the above and other objects and advantages in view, the invention consists of the novel details of construction, arrangement and combination of parts more fully hereinafter described, claimed and illustrated in the accompanying drawings, in which:

BRIEF DESCRIPTION OF THE DRAWINGS

FIGURE 1 is an elevational view, partly broken away, showing the disposition of a removable sampler embodying the invention in the flow of granulated solid particles from a hopper bin and a sampling bin into which samples collected by the sampler are discharged and retained;

FIGURE 2 is a detailed diagrammatic view taken on the line 2—2 of FIGURE 1, showing the manner in which the sampler is retained in position;

FIGURE 3 is an elevational view showing one form of sampler that is utilized to carry out the invention;

FIGURE 4 is a transverse sectional view of the sampler of FIGURE 3 taken on the line 4—4 thereof;

FIGURE 5 is an elevational view of another form of sampler embodying the invention;

FIGURE 6 is a transverse sectional view of the sampler of FIGURE 5 taken on the line 6—6 thereof;

FIGURE 7 is an elevational view of another form of sampler embodying the invention;

FIGURE 8 is a transverse sectional view of the sampler of FIGURE 7 taken on the line 8—8 thereof;

FIGURE 9 is an elevational view of another form of sampler embodying the invention;

FIGURE 10 is a transverse sectional view of the sampler of FIGURE 9 taken on the line 10—10 thereof;

FIGURE 11 is an elevational view of still another form of sampler embodying the invention;

FIGURE 12 is a transverse sectional view of the sampler of FIGURE 11 taken on the line 12—12 thereof;

FIGURE 13 is an elevational view of a further form of sampler embodying the invention; and FIGURE 14 is a transverse sectional view of the sampler of FIGURE 13 taken on the line 14—14 thereof.

DESCRIPTION OF THE PREFERRED EMBODIMENTS

Referring more in detail to the drawings, and particularly to FIGURES 1 to 4 inclusive thereof, wherein like parts are designated by like reference numerals, the reference numeral 10 is used to generally designate one form of sampler embodying the invention.

In conventional practice each ingredient in a solid propellant is fed into the open top of a mixer or mixing apparatus. Since such apparatus is of conventional structure, only a small portion thereof has been included in the drawings and such portion thereof is designated by the reference numeral 11.

The sampler 10 embodying the invention is utilized with a hopper bin 12 into which is deposited, for feeding into the mixing apparatus 11, a granulated solid material such as unground oxidizer.

Depending below the bin 12, in communication and in vertical alignment thereto, is a discharge tube 13 which extends into and terminates within the mixing apparatus 11. There is shown a handle 14 in the tube 13 which by the actuation thereof operates a conventional flap valve within the tube 13 to control the flow of the granulated material from the bin 12.

Secured by any well-known means to the exterior surface of the tube 13 in laterally extending, angular relation thereto is an apertured mounting boss 15 for the sampler 10. As will be understood the boss 15 has an inclined aperture 16 therein which is adapted to loosely receive the sampler 10 and an L-shaped slot 17 is provided in the outer end of the boss 15 that communicates with the aperture 16 therein and is adapted to receive a retaining pin 18 that is secured to and extends laterally from the outer surface of the sampler 10.

The sample 10 comprises a tubular open ended body 19 having a reduced threaded end 20 and a row of longitudinally equally spaced apertures 21 provided therein that are in longitudinal alignment with the pin 18. The discharge tube 13 is provided with one opening 22 that is in angular alignment with the aperture 16 in the boss 15 and a second opening 23 that is in angular alignment with the opening 22 and aperture 16.

In use the sampler 10 is inserted upwardly through the aperture 16 in the boss 15 and the openings 22 and 23 in the discharge tube 13. As the pin 18 nears the slot 17, it is received therein and it will advance therein until it engages the base of the L-shaped slot 17, upon this occurrence the sampler is slightly rotated and because of the formation of the L-shaped slot 17, is firmly retained in the position shown in FIGURE 1. The pin 18 and slot 17 also function as an aligning means for the positioning of the apertures 21 in proper relation to the flow of the granulated solid material through the tube 13.

After the sampler 10 has been properly positioned, an internally threaded circular closure cap 24 is engaged with the threaded end 20 on the body 19 of the sampler 10. The cap 24 prevents foreign material from entering the sampler 10 and also permits access thereto for the purpose of cleaning the sampler 10, if it is easier to accomplish the cleaning in this manner rather than removing the sampler 10 from its position in the tube 13.

As the granulated material enters the apertures 21 in the sampler 10 and discharges therefrom, it is received in a funnel 25 having a throat 26 thereon that is slidably and adjustably mounted in a circular neck 27 that extends upwards in vertical relation therewith from a sampling bin 28. A set screw 29 mounted in the neck 27 engages the throat 26 of the funnel 25 to retain it in proper relation to the open discharge end of the sampler 10, as shown in FIGURE 1.

In FIGURES 5 and 6 the sampler 30 also comprises a tubular open ended body 31 having a reduced threaded end 32 and a retaining pin 33. In this form of the sampler a longitudinally extending flat 34 is provided on the outer surface of the body 31 in alignment with the pin 33 and V-shaped slots 35 are provided in the face of the flat 34 in equally spaced relation to each other with the apexes thereof extended in the same direction.

In FIGURES 7 and 8 the sampler 40 comprises a tubular open ended body 41 having a reduced threaded end 42 and a retaining pin 43. The sampler 40 also has a flat 44 that extends longitudinally of the body 41 on the outer surface thereof in alignment with the pin 43 and equally spaced, transversely extending slots 45 are provided in the face of the flat 44.

In FIGURES 9 and 10 the sampler 50 comprises a tubular open ended body 51 having a reduced threaded end 52 and a retaining pin 53. The sampler 50 also has a flat 54 that extends longitudinally of the body 51 on the outer surface thereof in alignment with the pin 53 and a longitudinally extending slot 55 of shorter length than the flat 54 is positioned therein centrally thereof.

In FIGURES 11 and 12 the sampler 60 comprises a tubular open ended body 61 having a reduced threaded end 62 and a retaining pin 63. This form of the sampler does not have a flat in the outer surface thereof, but has a longitudinally extending slot 64 that extends longitudinally of the body 61 in alignment with the pin 63.

In FIGURES 13 and 14 the sampler 70 comprises a tubular open ended body 71 having a reduced threaded end 72 and a retaining pin 73. This form of the sampler is also devoid of a flat in the outer surface thereof, but has a longitudinally extending row of equally spaced slots 74 that are in alignment with the pin 73.

As previously stated, each of the samplers are positioned as shown in FIGURE 1 and previously described, and thus positioned are able to sample the granulated solid material as it flows through the tube 13 from the bin 12 into the mixing apparatus 11. The various forms of samplers illustrated and described are utilized to obtain samples of granulated solid materials of various sizes and in all instances the operation and structure of the various forms of samplers are identical, except for the formations therein that are used to sample the granulated material.

It is believed that from the foregoing description the structure and manner of use of the invention will be clear to those skilled in the art and it is to be understood that variations in the structure and mode of operation of the invention may be adhered to to provide such variations as fall within the spirit of the invention and the scope of the appended claims.

Having thus described the invention what is claimed as new and desired to be secured by Letters Patent is:

1. A sampling apparatus for use with a supply bin, for granulated solid materials, having a discharge tube depending therefrom in vertical relation thereto, comprising a mounting boss having an aperture therein that is mounted on said discharge tube so that said boss extends laterally thereof in angular relation thereto, said tube having first and second openings therein that are in angular alignment with the aperture in said boss, a tubular sampler mounted in said boss and extending through said first and second openings, said sampler having at least one orifice therein and means on said boss coacting with means on said tubular sampler to retain said sampler in said boss and the means on said tubular sampler being in longitudinal alignment with said at least one orifice.

2. A sampling apparatus as in claim 1, wherein said sampler is provided with a flat in the outer surface thereof and the said at least one orifice is positioned in said flat centrally thereof.

3. A sampling apparatus as in claim 2, wherein said orifice is a longitudinally extending slot.

4. A sampling apparatus as in claim 2, wherein said orifice is a transversely extending slot.

5. A sampling apparatus as in claim 2, wherein said orifice is of V-shape.

6. A sampling apparatus as in claim 1, wherein said orifice is a longitudinally extending slot.

7. A sampling apparatus as in claim 1, wherein said orifice is a short longitudinally extending slot.

8. A sampling apparatus as in claim 1, wherein said orifice is a circular opening.

9. A sampling apparatus as in claim 1, wherein said sampler is provided with a reduced threaded end and an internally threaded closure cap is threadably connected to said reduced threaded end.

10. A sampling apparatus as in claim 1, wherein the means on said boss coacting with the means on said sampler comprises an L-shaped slot and said last said means on said boss coacting with the means on said slot.

References Cited

UNITED STATES PATENTS

| | | | |
|---|---|---|---|
| 1,966,712 | 7/1934 | Fisher et al. | 73—422 |
| 2,331,227 | 10/1943 | Proudlock | 73—425.2 X |
| 3,000,219 | 9/1961 | De Boalt | 73—422 |
| 3,080,760 | 3/1963 | Piersma | 73—425.2 |
| 3,217,548 | 11/1965 | Cordell et al. | 73—422 |

DAVID SCHONBERG, *Primary Examiner.*

D. M. YASICH, *Assistant Examiner.*